United States Patent Office 3,503,167
Patented Mar. 31, 1970

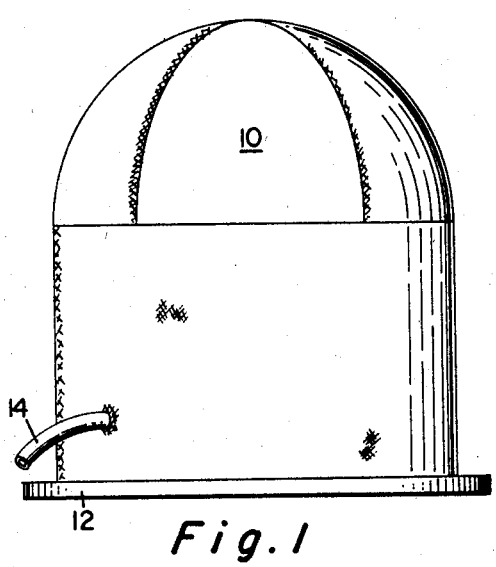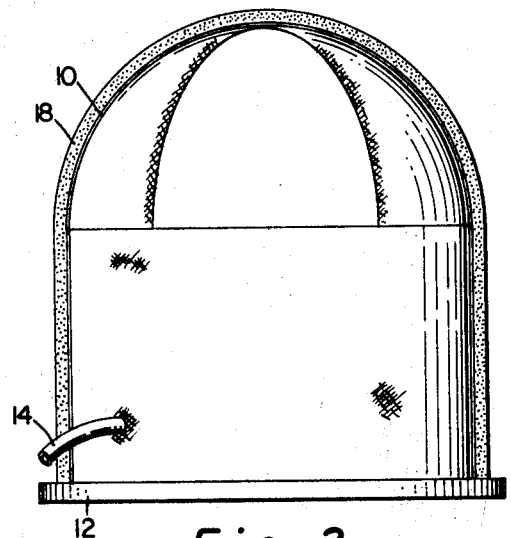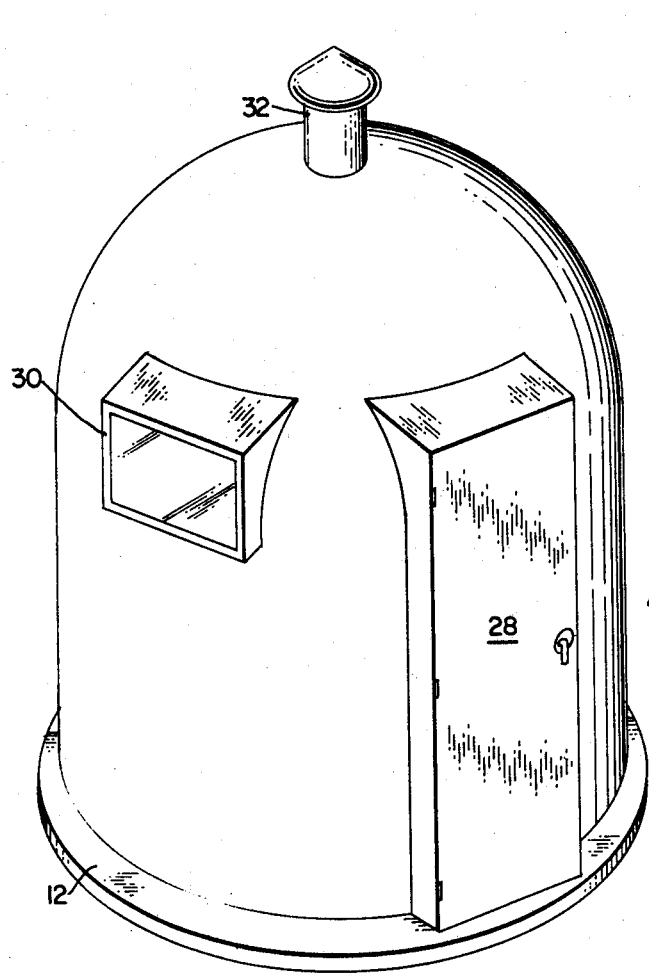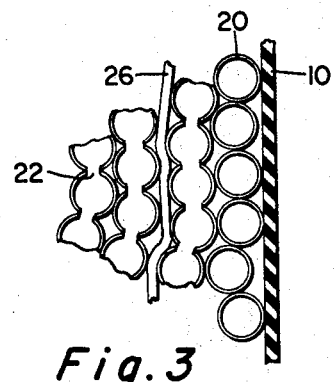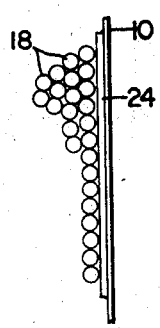
INVENTOR.
WILLIAM L. MACKIE

3,503,167
BUILDING STRUCTURE WITH DIFFERENT FOAM LAYERS
William L. Mackie, Ventura, Calif., assignor to the United States of America as represented by the Secretary of the Navy
Filed Sept. 25, 1968, Ser. No. 762,463
Int. Cl. E04c 2/10; E04g 11/04; E04b 1/04
U.S. Cl. 52—173          4 Claims

ABSTRACT OF THE DISCLOSURE

An expendable shelter for men or equipment and the method of forming the same comprising an inflated form secured to a base plate and a thick insulation foam plastic sprayed over the outside of the form and allowed to harden. Doors and windows may be cut out as required. To improve temperature control, the use of different types of foamed plastic in layers is envisioned.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Field of the invention

The present invention relates generally to improvements in building construction and more specifically to the fabrication of expendable lightweight shelters for quick erection in remote areas.

Description of the prior art

Explorations are being carried out all over the globe and in many cases at remote regions with no facilities for extensive logistic support. Such projects frequently require the provision of suitable shelters to house both men and equipment for an extended period of time. The transportation of conventional building materials or prefabricated structures to such area is always difficult and frequently is impossible. It is, therefore an absolute necessity to have materials that are lightweight and compact and which may readily be erected on site.

Many prior constructions employing foamed plastic materials for fabrication purposes have been proposed due to their low bulk and excellent protective characteristics. However prior shelters were primarily of the prefabricated type wherein structural panels were shipped to the site and assembled. An inherent disadvantage of such practices includes damage to panels during transit and water leakage at the joints of assembled panels in inclement weather. In few instances, unit molds have been shipped to the site and processed in the field but this did not satisfy the necessary requirements of low bulk and weight.

SUMMARY OF THE INVENTION

The present foam plastic shelter is built to withstand polar, tropic, desert and other harsh environments and includes an inflatable form which is unfolded at the site and inflated with a suitable air compressor. A layer of plastic foam is sprayed over the form and after curing the mold or form may be deflated and removed.

Prefabricated window frames, doors and vents may be manufactured with simple hand tools and then placed in the shelter or alternatively the frame elements thereof may be properly positioned in the shelter and foam sprayed thereon. Plywood or foam plastic which is pressed into a smooth footing may be used for the floor. Plumbing, ductwork and electric wiring may be laid across the form uninsulated and will be anchored in place by sprayed foam plastic which also acts to insulate the pipes, ducts and wires.

STATEMENT OF THE OBJECTS OF INVENTION

An object of this invention is to provide a simple, strong and effective lightweight shelter for men and equipment in remote or harsh environments capable of being easily transported and which can be erected in a minimum time in the field.

Another object is to provide an improved shelter made of foamed plastic material sprayed over a collapsible form.

Still another object is to provide such a shelter having improved thermal characteristics.

Other objects, advantages, and novel features of the invention will become apparent from the following detailed description of the invention when considered in conjunction with the accompanying drawings.

BRIEF DESCRIPTION OF THE DRAWING

FIGURE 1 is a side elevational view of an inflatable form used in the construction of this invention, shown fully inflated.

FIGURE 2 is a side elevational view with a portion of the plastic covering broken away of the inflated form upon which foam plastic has been sprayed.

FIGURE 3 is an enlarged cross section of a portion of the plastic shelter wall showing the inner monocellular layer of plastic foam and outer interconnected cell layer of foam.

FIGURE 4 is a side elevation of a finished shelter with door, window and vent in place.

FIGURE 5 is an enlarged cross sectional view of an embodiment having a fiberglass mat incorporated into the finished shelter.

DESCRIPTION OF THE PREFERRED EMBODIMENT

Referring now to the drawings in detail there is shown an inflatable form 10 in erect or inflated condition. The form is constructed of a flexible material such as adhesively bonded nylon fabric that can be folded into a compact package when not in use and may be shaped to any desired configuration.

Form 10 may be positioned on any suitable base 12 such as a plywood disk or platform and may be inflated by a pressure means connected to the hose 14. The pressure within the form must be sufficiently great to withstand the weight of any additional substances which may be applied to the form surface. A conventional mold or form releasing agent may be sprayed over the form surface prior to application of the foam plastic casting material to facilitate the form removal once the cast material has cured.

After suitably inflating the form 10 and application of the releasing agent, a casting material 18 such as a foam plastic is sprayed over the form surface to a sufficient depth and allowed to cure. While the casting material may be any suitable substance, it is preferably a polyurethane due to its excellent nonflammable and insulation characteristics. After the plastic urethane foam casting material has cured, the form is collapsed and removed from the cast shelter.

For use in hot, dry climates the sprayed plastic urethane foam preferably includes a waterproof insulating inner monocellular layer of non-interconnected cells 20 and an outer porous layer of interconnected cells 22 (see FIGURE 3). With this construction moisture deposited upon such a structure and allowed to filter down the outside wall will produce a pronounced cooling effect by evaporation.

If desired a metallized urethane foam may be employed to improve strength and control heat transmission when the shelter is located in an intemperate climate.

An impregnated fiberglass mat 24 may optionally be placed over the inflated form 10 prior to application of the foamed urethane casting material 20. The mat becomes an inherent part of the finished shelter and serves as a vapor barrier against rain or snow. Note FIGURE 5.

In order to provide heating in the shelter, suitable conductors 26 such as Nichrome wires may be wound on the form and anchored in place by the sprayed foam urethane casting material 20. When the foam has cured and the inflatable form removed from the shelter, the embedded wires remain attached to the inside surface of the shelter. Upon addition of a suitable power source not shown in the drawing, the conducting wires 26 may be connected thereto for adequate heating of the shelter. The urethane foam is an excellent electric insulator and inhibits any electrical short circuits in the heating wires.

Door, window and vent openings may be cut out of the cast urethane material 20 and prefabricated doors 28, window frames 30 and vents 32 may be inserted in the openings. Conversely the doors 28, window frames 30 and vents 32 may be attached to the inflated form 10 and then locked in place with the sprayed foam plastic 20. After application of the foam to the entire form, said form is then deflated and removed through the door 28. Plywood may be used for the floor or urethane foam can be sprayed on the floor area and patted into shape prior to curing.

The entire finished shelter is sufficiently light and compact to be airlifted by a helicopter to a desired location. Furthermore they may be made in a number of sizes and configurations. It is emphasized that the same form 10 is easily removed from a completed shelter and reused if additional shelters are required.

Obviously many modifications and variations of the present invention are possible in the light of the above teachings. It is therefore to be understood that within the scope of the appended claims the invention may be practiced otherwise than as specifically described.

I claim:
1. A light, compact and expendable shelter comprising:
   a preshaped casting of polyurethane foam material having an inner monocellular layer with separate nonconnected cells and an outer porous layer with open interconnected cells;
   electrical wiring embedded in the polyurethane foam, said wiring adaptable for heating purposes and said foam acting as an insulator;
   prefabricated windows held in position on said shelter by additional layers of polyurethane foam;
   a prefabricated door also held in position on said shelter by additional layers of polyurethane foam; and
   a floor positioned along the base of said shelter.
2. The expendable shelter of claim 1 wherein an impregnated glass mat is inherently positioned adjacent the inner layer of separate nonconnected cells of the polyurethane foam in order to serve as a vapor barrier.
3. The expendable shelter of claim 1 wherein the floor is plywood.
4. The expendable shelter of claim 1 wherein the floor is pressed urethane foam.

References Cited

UNITED STATES PATENTS

| | | | |
|---|---|---|---|
| 3,184,210 | 5/1965 | Fasswacht | 52—309 |
| 3,200,236 | 8/1965 | Geyer | 52—173 X |
| 3,315,424 | 4/1967 | Smith | 52—206 |

OTHER REFERENCES

Science News Letter, Jan. 2, 1960, vol. 77, No. 1 p. 7.

JOHN E. MURTAGH, Primary Examiner

U.S. Cl. X.R.

52—204, 309; 219—213